US010567326B2

(12) United States Patent
Kim et al.

(10) Patent No.: US 10,567,326 B2
(45) Date of Patent: Feb. 18, 2020

(54) INTERWORKING OF SOCIAL MEDIA SERVICE AND MACHINE TO MACHINE SERVICE

(71) Applicant: KT CORPORATION, Gyeonggi-do (KR)

(72) Inventors: Dong-Jun Kim, Seoul (KR); Jun-Won Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 360 days.

(21) Appl. No.: 14/190,364

(22) Filed: Feb. 26, 2014

(65) Prior Publication Data

US 2014/0244770 A1 Aug. 28, 2014

(30) Foreign Application Priority Data

Feb. 26, 2013 (KR) .................. 10-2013-0020597

(51) Int. Cl.
*G06F 15/16* (2006.01)
*H04L 12/58* (2006.01)

(52) U.S. Cl.
CPC .................. *H04L 51/32* (2013.01)

(58) Field of Classification Search
CPC .................. H04W 92/18; G06Q 50/01
See application file for complete search history.

(56) References Cited

U.S. PATENT DOCUMENTS

| 9,179,104 B2 * | 11/2015 | Fan | H04N 7/181 |
| 9,318,019 B2 * | 4/2016 | Muramatsu | G08G 1/0133 |
| 9,460,448 B2 * | 10/2016 | Felgate | G06Q 30/0224 |
| 2008/0117201 A1 | 5/2008 | Martinez et al. | |
| 2009/0316594 A1 | 12/2009 | Kim et al. | |
| 2010/0104258 A1 | 4/2010 | Amsterdam et al. | |
| 2011/0029474 A1 * | 2/2011 | Lin | G06N 5/04 706/50 |
| 2012/0016528 A1 * | 1/2012 | Raman | G06F 9/5094 700/291 |
| 2012/0179972 A1 | 7/2012 | Hacid et al. | |
| 2012/0254307 A1 * | 10/2012 | Jeong | G06Q 50/01 709/204 |
| 2013/0110806 A1 * | 5/2013 | Cai | G06F 17/30946 707/706 |
| 2013/0266293 A1 | 10/2013 | Amsterdam et al. | |
| 2014/0081998 A1 * | 3/2014 | Fan | G06Q 10/10 707/754 |
| 2014/0146795 A1 * | 5/2014 | Tian | H04W 68/02 370/336 |

(Continued)

FOREIGN PATENT DOCUMENTS

| KR | 10-2009-0090573 A | 8/2009 |
| KR | 10-2009-0091199 A | 8/2009 |
| KR | 10-2010-0000151 A | 1/2010 |

(Continued)

*Primary Examiner* — Hamza N Algibhah
*Assistant Examiner* — Tesfu N Mekonen
(74) *Attorney, Agent, or Firm* — IP Legal Services, LLC

(57) ABSTRACT

The disclosure is related to an interworking procedure between a social media service (e.g., a social network service) and a machine to machine (M2M) service. More specifically, the interworking procedure may be performed based on location information (e.g., a location of user equipment).

20 Claims, 7 Drawing Sheets

(56) References Cited

U.S. PATENT DOCUMENTS

2014/0180877 A1* 6/2014 Dotolo ............... G06Q 30/0631
705/26.64
2014/0297806 A1* 10/2014 Hwang ................ H04W 4/206
709/219

FOREIGN PATENT DOCUMENTS

| KR | 10-2010-0047136 A | 5/2010 |
| KR | 10-1101111 B1 | 12/2011 |
| KR | 10-2012-0047333 A | 5/2012 |
| KR | 10-2012-0052266 A | 5/2012 |
| KR | 10-2012-0111667 A | 10/2012 |

* cited by examiner

INTERWORKING OF SOCIAL MEDIA SERVICE AND MACHINE TO MACHINE SERVICE

CROSS REFERENCE TO PRIOR APPLICATIONS

The present application claims priority under 35 U.S.C. § 119 to Korean Patent Application No. 10-2013-0020597 (filed on Feb. 26, 2013), which is hereby incorporated by reference in its entirety.

TECHNICAL FIELD

The present disclosure relates to interworking of heterogeneous network services and, in particular, to interworking of a social media service and a machine to machine (M2M) service.

BACKGROUND

A machine to machine (M2M) communication refers to any communication scheme which does not require human intervention in the process of communication. In other words, the M2M communication refers to a communication for providing persons or intelligent equipment with object information using communication networks, or allowing persons or intelligent equipment to control states of objects. The M2M communication may be variously referred to as a machine type communication (MTC), Internet of things (IoT), a smart device communication (SDC), a machine oriented communication (MOC), or an object to object intelligent network (O2N).

A variety of technologies such as a location awareness, a context awareness, and/or an augmented reality may be introduced in an M2M service or an M2M network. Accordingly, a purpose of the M2M communication is to further improve the quality and stability of M2M communication services, while automatically performing operations customized to users and/or situations without a human intervention or in a state in which a human intervention is minimized.

An M2M communication may be employed for overcoming a variety of social issues (e.g., a disaster prevention, an energy saving) through u-City, u-Health, u-Transportation, u-Environment industries, and so forth. An M2M service associated with the M2M network communication may include a remote metering, a building/facility management, a vending machine management, an indoor lighting adjustment, a traffic information/vehicle control, an emergency rescue, a fire alarm, a security alarm, a telemetry, and so forth.

M2M communication started from an ubiquitous sensor network for a local area. However, as the scope and purpose of M2M applications diversified, a variety of wired/wireless communication networks may be employed for the M2M communication. For example, local area wireless communication techniques (e.g., Zigbee, Bluetooth, WiFi, etc.) having low-cost and low-power characteristics, and cellular-based mobile communication techniques (e.g., a 3GPP communication, an LTE communication, etc.) having high-speed may be employed for a variety of services such as situation awareness, location information service, and/or a remote control.

A typical M2M communication may be used to collect objective information (or quantitative data) (e.g., 25° C., 5 km/hour, etc.) by remotely monitoring or controlling a plurality of M2M devices. However, the typical M2M communication is operated according to a predetermined operation policy (e.g., a data collection period, a device operation condition, etc.). Accordingly, there may be a limitation of not being able to collect data adaptively and in real time according to an environment change.

Meanwhile, a variety of social network services (SNS) such as Facebook, Twitter, and/or Kakao Talk are being widely used to form human networks (social networks) between users on the web. The social network services (SNS) may enable users to rapidly share ideas, pictures, posts, activities, events, interests, and living information with people in their network. Particularly, due to proliferation of mobile terminals such as smart phones, users may share various information anywhere and anytime. Data/information (e.g., hot, cold, traffic jam, etc.) shared through the social network service (SNS) may have characteristics of subjective data/information (or qualitative data/information) since the data/information is associated with human activities.

In summary, M2M services and SNS may provide data/information (e.g., weather data, traffic data, etc.) associated with a human life. However, data/information shared in SNS services may be subjective, qualitative, abstract, and real-time, whereas data/information provided through M2M services may be objective, quantitative, and accurate. Accordingly, the M2M service and the SNS may be required to interwork.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an interworking procedure between a social media service (e.g., a social network service (SNS)) and a machine to machine (M2M) service may be provided. More specifically, the interworking procedure may be performed based on location information (e.g., a user location).

In accordance with at least one embodiment, a method may be provided for performing an interworking procedure between a social media service and a machine to machine (M2M) service in a social media server. The method may include extracting at least one keyword associated with the M2M service from user input data, obtaining location information corresponding to the at least one keyword, generating a request message including the at least one keyword and the location information, transmitting the request message to an M2M service server, receiving M2M data in response to the request message; and, providing additional information formed based on the M2M data, to corresponding user equipment.

The location information may be a location of the corresponding user equipment at a time when the user input data is input.

The location information may include at least one of (i) location information obtained through a location information obtaining system of the corresponding user equipment, and (ii) location information input by a user.

The at least one keyword may be extracted using a keyword table.

The request message include at least one of a header, sender information, the location information, the at least one keyword, and an additional field for an M2M content value The method social media server may be a social network service (SNS) server.

In accordance with another embodiment, a method may be provided for performing an interworking procedure between a social media service and a machine to machine (M2M) service in a social media server. The method may include extracting at least one keyword associated with the M2M service from user input data, obtaining location information corresponding to the at least one keyword, determining at least one M2M device type corresponding to the at least one keyword, generating a request message including the location information and the at least M2M device type, transmitting the request message to an M2M service server, receiving M2M data in response to the request message, and providing additional information formed based on the M2M data, to corresponding user equipment.

The request message may include at least one of a header, sender information, the location information, the at least one M2M device type, and an additional field for an M2M content value.

In accordance with still another embodiment, a method may be provided for performing an interworking procedure between a social media service and a machine to machine (M2M) service in an M2M service server. The method may include receiving a request message from a social media server, obtaining (i) at least one of one or more keywords and one or more M2M device types, and (ii) location information, by analyzing the request message, determining at least one M2M device corresponding to an analysis result of the request message, obtaining M2M data from the at least one M2M device, and transmitting the M2M data to the social media server.

The obtaining (i) at least one of one or more keywords and one or more M2M device types, and (ii) location information may include determining one or more M2M device type corresponding to the one or more keywords, in a case that the request message includes the one or more keywords and the location information.

The determining may include determining the at least one M2M device corresponding to the one or more device types and the location information.

The determining may include determining the at least one M2M device by performing a resource discovery.

The obtaining M2M data may further include controlling a data collection period if the at least one M2M device is in a normal operation mode.

The obtaining M2M data may further include performing a wake-up procedure if the at least one M2M device is in a sleep mode.

The method may further include determining a social media traffic state associated with the at least one M2M device, determine at least one neighboring M2M device based on the location information when a social media traffic amount is over a threshold value, and transmitting a data request to the at least one neighboring M2M device.

The method may further include receiving additional M2M data from the at least one neighboring M2M device, and providing the additional M2M data to at least one of the social media server and a different service provider.

At least one of the number of the neighboring M2M devices and a range of the neighboring M2M devices may be determined based on the social media traffic state.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
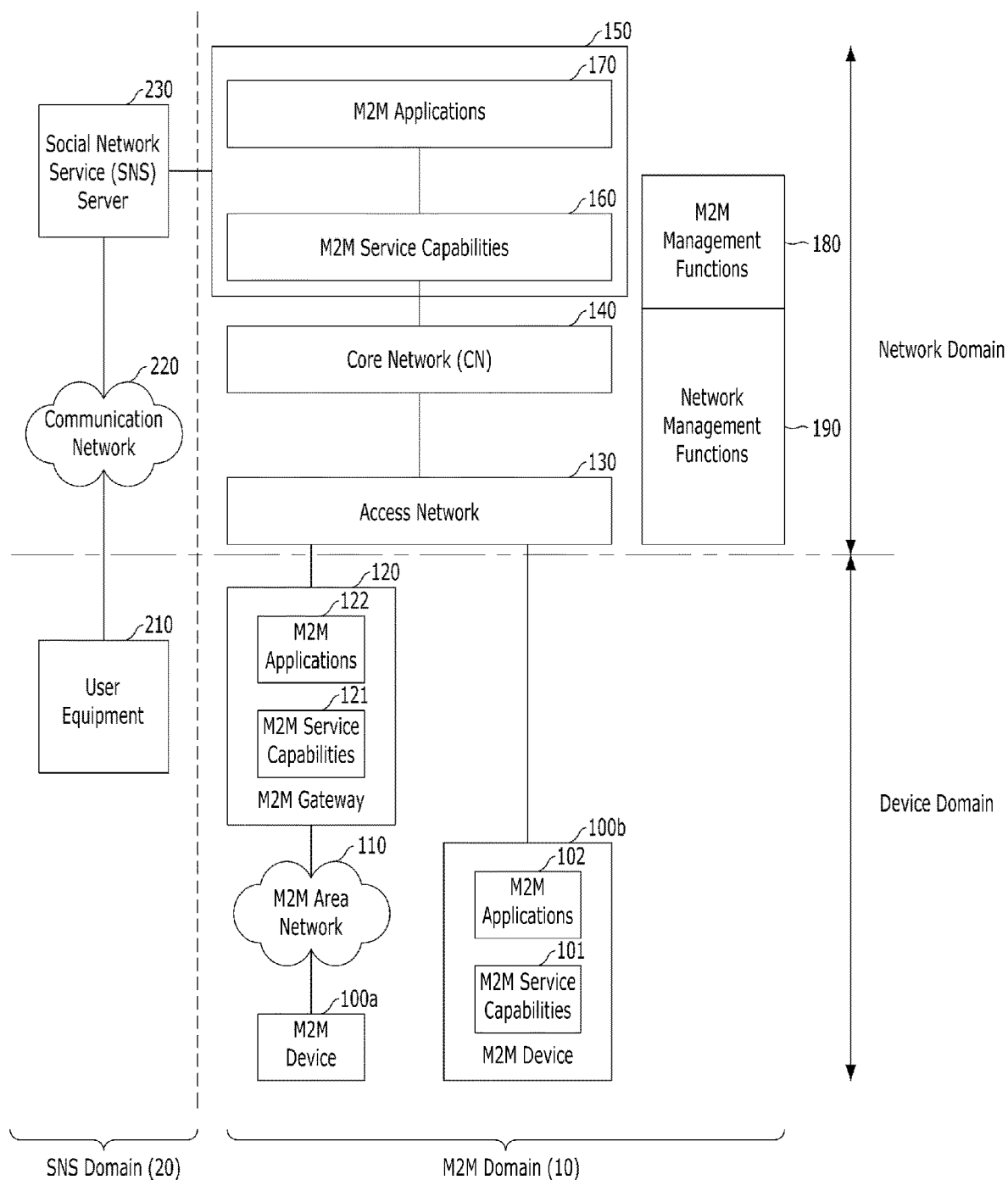
FIG. 1 illustrates a system architecture for interworking of a social network service (SNS) and an M2M service in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may perform an interworking procedure between social media service (e.g., a social network service (SNS)) and a machine to machine (M2M) service. Particularly, the interworking procedure may be performed based on location information (e.g., a user location).

A social media may refer to interaction among people in which they create, share, and/or exchange information and ideas in virtual communities and networks. The social media may include blogs, social networks, message boards, podcasts, wikis, video blogs (vlogs), a picture sharing, and so forth, but is not limited thereto. Accordingly, in the present specification, the term "social media" may be used as a superordinate concept including the term "social network" and "social network service (SNS)." However, for a convenience of descriptions, the present embodiment will be described in connection with "a social network" and "a social network service (SNS)." Accordingly, descriptions associated with the SNS may be applied to a variety of social media services.

FIG. 1 illustrates a system architecture for interworking of a social network service and an M2M service in accordance with at least one embodiment.

Referring to FIG. 1, a system for interworking of a social network service (SNS) and an M2M service may include M2M domain 10 and SNS domain 20. Herein, M2M domain 10 may be referred to as an M2M system or an M2M communication network domain. SNS domain 20 may be referred to as an SNS system or a social network domain. Each of M2M domain 10 and SNS domain 20 may be divided into a network domain and a device domain.

M2M domain 10 may include an M2M device domain and an M2M network domain. Herein, the M2M device domain may include one or more M2M devices 100a and 100b, M2M area network 110, and M2M gateway 120. Meanwhile, the M2M network domain may include access network 130, core network (CN) 140, M2M service capabilities (SCs) 160, M2M applications 170, M2M management functions 180, and network management functions 190. Particularly, in the present embodiment, M2M service capabilities (SCs) 160 and M2M applications 170 may be referred to as "M2M service server 150."

In the M2M device domain, M2M devices 100a and 100b are terminals that perform communication without a human intervention or in a state in which human intervention is minimized. In particular, M2M devices 100a and 100b may refer to any type of devices that send and forward data stored therein, in response to an external request or automatically.

According to the ETSI standard, M2M devices may be classified into (i) M2M device 100b including M2M applications 102 and M2M service capabilities (SCs) 101, and (ii) M2M device 100a not including M2M applications and M2M service capabilities (SCs). In the case that M2M device 100b directly connects to access network 130, M2M device 100b may run M2M applications 102 using M2M service capabilities (SCs) 101. Herein, the M2M applications 102 may be referred to as "device applications (DAs)." Meanwhile, M2M device 100a may not include M2M applications and M2M service capabilities (SCs). Accordingly, M2M device 100a may connect to access network 130 via M2M gateway 120. In this case, M2M device 100a may use M2M service capabilities (SCs) 121 of M2M gateway 120. Furthermore, M2M device 100a may be connected to M2M gateway 120 through M2M area network 110. For example, M2M device 100a may include devices used for a health care, and payment terminals for an offline payment (e.g., payment using a card or a smart card) and/or a mobile payment (e.g., payment using a smart phone).

M2M area network 110 may provide connectivity between M2M device 100a and M2M gateway 120. More specifically, M2M area network 110 may independently perform a variety of functions such as a network connection, a communication function, a data processing, a management function, and/or a maintenance function such that a sensing and/or operations of M2M devices can be properly performed. Furthermore, for example, M2M area network 110 may include a personal area network (PAN) and/or a local area network (LAN), but is not limited thereto. The PAN may include IEEE 802.15.x, Zigbee, Bluetooth, IETF ROLL, ISA100.11a, RFID, and so forth. The LAN may include PLC, M-BUS, Wireless M-BSU, KNX, and so forth. In addition, a variety of technologies such as a communication technology for vehicles, an industrial network, a building automation technology, and/or a home automation technology may be applied in connection with M2M area network 110.

M2M gateway 120 may run M2M applications 122 using M2M service capabilities (SCs) 121. Herein, M2M applications 122 may be referred to as "gateway applications (GAs). M2M gateway 120 may act as a proxy between M2M device 100a and access network 130. In other words, M2M gateway 120 may perform a network entry, a routing process, and/or a communication process such that M2M device 100a connected through M2M area network 110 can be connected to access network 130. Furthermore, M2M gateway 120 may receive (or collect) device operation data (e.g., sensed data) from M2M device 100a, and transmit the device operation data to a remote operation server.

As described above, in order to provide an M2M service, M2M gateway 120 and M2M device 100b may perform a variety of functions such as data collection/report functions, a remote control function, group or one-to-one communication functions, a transaction function, and so forth.

Access network 130 may allow M2M device 100b and/or M2M gateway 120 to communicate with core network (CN) 140. Access network 130 may include a variety of wired/wireless access networks. For example, access network 130 may include a CDMA/WCDMA network, a WiFi network, a WiMax network, an xDSL network, a hybrid fiber coaxial (HFC) network, a FTTH network, a PLC network, a satellite network, GERAN, UTRAN, eUTRAN, a wireless LAN, and/or an LTE network, but is not limited thereto. Furthermore, access network 130 may perform a security function when M2M device 100b and/or M2M gateway perform an access procedure.

Core network (CN) 140 may provide an IP connectivity, an access network control, network/service control functions, an interconnection with other networks, roaming functions, and so forth. Core network (CN) 140 may provide voice/data services having large-capacity and/or long distance characteristics. For example, core network 140 may include 3GPP CN, ETSI TISPAN CN, 3GPP2 CN, and/or an IP multimedia subsystem (IMS), but is not limited thereto. More specifically, core network 140 may be a large and high-speed backbone network such as a public switched telephone network (PSTN), an integrated services digital network (ISDN), an IMT-2000 network, a wide area network (WAN), LAN, a CATV network, an Internet backbone network. Furthermore, core network (CN) 140 may include M2M service capabilities which perform M2M network functions.

As described above, access network 130 and core network (CN) 140 may perform a data transfer function (e.g., transfer functions of control information and/or M2M data) such that data communication can be performed between M2M applications 170 and M2M devices 100a and 100b.

M2M service capabilities (SCs) 160 in the M2M network domain may provide functions that are to be shared by different applications, and environments that allow access to other service capabilities through open interfaces. The use of the M2M service capabilities may make it possible to develop and deploy optimized applications without considering characteristics of lower network layers. More specifically, M2M service capabilities (SCs) 160 may identify and store information associated with a provision of application functions, and perform a communication selection, a remote object management, a security, a transaction management, and/or an interworking process. Core network 140 and M2M service capabilities (SCs) 160 may be referred to as "an M2M core." An M2M service capabilities layer associated with M2M service capabilities 160 may be referred to as "a network service capabilities layer (NSCL)." Hereinafter, for convenience, the NSCL may be indicated by the numeral "160".

M2M applications 170 of the M2M network domain may run an M2M service logic associated with a variety of services to be provided to M2M devices 100a and 100b, and use M2M service capabilities 160 through an open interface provided in the M2M system. Furthermore, M2M applications 170 may interwork with the M2M core such that wired/wireless connections between an operator or user terminal and M2M devices 100a and 100b can be established. M2M applications 170 may be referred to as "network applications (NA)."

In addition, the M2M network domain may include M2M management functions 180 and network management functions 190. Herein, M2M management functions 180 may include all the functions required to manage M2M service capabilities 160 in the M2M network domain. More specifically, M2M management functions 180 may perform such managements associated with an M2M network as a network configuration management, a fault management, and/or a subscriber management. In this case, the management of the M2M devices (e.g., 100a, 100b) and the M2M gateways (e.g., 120) may use a specific M2M service capability. Meanwhile, network management functions 190 may include all the functions required to manage access network 130 and core network 140. For example, network management functions 190 may include a variety of functions such as a network configuration management, a performance management, a provisioning, a supervision, a fault management, a subscriber management, a security management (i.e., a security management required for providing an M2M service), and so forth.

Furthermore, M2M service capabilities 160 in the M2M network domain may be referred to as a network service capabilities layer (NSCL). M2M service capabilities 121 in M2M gateway 120 may be referred to as a gateway service capabilities layer (GSCL). M2M service capabilities (e.g., 101) in M2M devices (e.g., 100b) may be referred to as a device service capabilities layer (DSCL). The NSCL, the GSCL, and the DSCL may be collectively referred to as a service capabilities layer (SCL). The NSCL may refer to individual platforms established for services by M2M service providers.

Referring back to FIG. 1, SNS domain 20 may include user equipment 210 and social network service (SNS) server 230. Herein, user equipment 210 and social network service (SNS) server 230 may be connected through communication network 220. Herein, communication network 220 may include a wired network and a wireless network.

User equipment 210 may be a terminal which is able to support an SNS. User equipment 210 may access SNS server 230 using an SNS application. In this case, when users input certain data using the SNS application, user equipment 210 may create a variety of traffic information such as text information, and/or image information, and transmit the traffic information to SNS server 230. Herein, traffic information may refer to social network information which is created through user equipment 210 according to activities of SNS users. In the present specification, the traffic information may be referred to as "SN traffic information," "traffic data," "user input data," "user input message," "SN data," "SN traffic," or "SN message." User equipment 210 may be a terminal which is able to perform a data communication through a communication network. For example, user equipment 210 may be at least one of (i) a mobile terminal such as a wideband CDMA (WCDMA) phone, a smart phone, a smart pad, a personal digital assistant (PDA), a notebook computer, a net-book computer, and/or an e-book, and (ii) a fixed terminal such as a personal computer, and/or a smart TV, but is not limited thereto.

SNS server 230 may analyze the SN traffic information (e.g., "Did an accident happen? The road is completely jammed. I will be late.") received from user equipment 210, and extract at least one keyword (e.g., accident, road, jam) associated with an M2M service from the SN traffic information. When extracting the at least one keyword, SNS server 230 may transmit the extracted keyword(s) to M2M service server 150. Furthermore, SNS server 230 may obtain location information associated with the keyword(s). For example, SNS server 230 may obtain location information of user equipment 210 at the time when the traffic information is input. In other embodiments, SNS server 230 may further determine at least one M2M device type associated with at least one keyword. Herein, the M2M device type may referred to as "a mapping M2M device," "a mapping sensor." For example, in the case that keywords are "accident," "road," and "jam," the M2M device type may be determined as "a CCTV camera" and "a speed measurement device."

SNS server 230 may generate a request message including at least one of the keyword(s), the location information, and the M2M device type(s) (i.e., a mapping M2M device). More specifically, SNS server 230 may generate a request message including the keyword(s) and the location information. In other embodiments, SNS server 230 may generate a request message including the location information and the M2M device type(s) (i.e., a mapping M2M device). Herein, the request message may be generated according to an 'SNS M2M data exchange format' (SMDEF). The SMDEF will be described in more detail with reference to FIG. 3. When generating an SMDEF request message, SNS server 230 may transmit the SMDEF request message to M2M service server 150.

When receiving the SMDEF request message from SNS sever 230, M2M service server 150 may obtain at least one of the keyword(s), the location information, and the M2M device type(s), by analyzing the received SMDEF request message. More specifically, in the case that the SMDEF request message is generated using the keyword(s) and the location information, M2M service server 150 may obtain the keyword(s) and the location information by analyzing the received SMDEF request message. In this case, M2M service server 150 may determine at least one corresponding M2M device, based on the keyword(s) and the location information obtained through a message analysis process. More specifically, M2M service server 150 may obtain information on at least one corresponding M2M device which (i) is located at a specific district corresponding to the location information, and (ii) is associated with the keyword(s). In this case, M2M service server 150 may obtain information on the at least one corresponding M2M device, from M2M device information stored in a storage unit.

In other embodiments, in the case that the SMDEF request message is generated using the M2M device type(s) and the location information, M2M service server 150 may obtain the M2M device type(s) and the location information by analyzing the received SMDEF request message. More specifically, M2M service server 150 may obtain information on at least one corresponding M2M device (e.g., a CCTV camera) which (i) is located at a specific district corresponding to the location information, and (ii) corresponds to the M2M device type(s). In this case, M2M service server 150 may obtain information on the at least one corresponding M2M device, from M2M device information stored in a storage unit.

M2M service server 150 may obtain M2M data (e.g., sensed data) by requesting to the at least one corresponding M2M device. In this case, M2M service server 150 may check states (e.g., an operation state) of the at least one corresponding M2M device, and transmit a control signal to each of the at least one corresponding M2M device. For example, in the case that a corresponding M2M device is in a normal operation mode, M2M service server 150 may transmit a control signal for reducing a data collection period (e.g., a data sensing period). In the case that a corresponding M2M device is in a sleep mode (or a waiting mode), M2M service server 150 may transmit a wake-up signal to the corresponding M2M device.

In other embodiments, in the case that an SN traffic amount associated with a specific keyword and a specific location is over a threshold value, M2M service server 150 may transmit a data request to at least one neighboring M2M device (i.e., one or more M2M devices in a neighboring district of the specific location corresponding to the location information). M2M data obtained from the at least one neighboring M2M device may be referred to as "second M2M data," or "additional M2M data." M2M service server 150 may transmit the second M2M data (additional M2M data) to SNS server 230 such that additional services associated with a corresponding keyword can be provided to user equipment 210. Such procedure of obtaining the second M2M data from the neighboring M2M devices will be described in more detail with reference to FIG. 8 and FIG. 9.

Figures 2, 3:
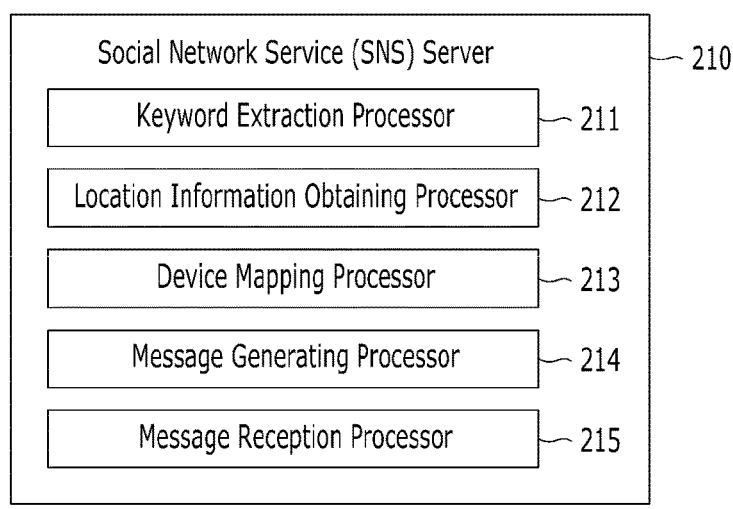
FIG. 2 illustrates a social network service (SNS) server in accordance with at least one embodiment.
FIG. 3 illustrates a structure of an SMDEF message in accordance with at least one embodiment.

FIG. 2 illustrates a social network service (SNS) server in accordance with at least one embodiment.

As shown in FIG. 2, SNS server 230 may include keyword extraction processor 211, location information obtaining processor 212, device mapping processor 213, message generating processor 214, and message reception processor 215.

Keyword extraction processor 211 may collect periodically or in real time SN traffic information (e.g., "Did an accident happen? The road is completely jammed. I will be late.") created (or input) through user equipment 210, and extract at least one keyword (e.g., accident, road, jam) associated with an M2M service, from the collected SN traffic information. More specifically, keyword extraction processor 211 may extract at least one keyword from user input data (e.g., a sentence input through SNS user equipment 210), by using a keyword extraction algorithm. Herein, the keyword extraction algorithm may perform a morpheme analysis and/or a root extraction. The keyword extraction algorithm applied in the present embodiment may be a variety of typical keyword extraction algorithms, especially keyword extraction algorithms which are used in the services provided based on a keyword extraction. For example, keyword extraction processor 211 may extract at least one keyword corresponding to preset keywords stored in a keyword table. In this case, keyword extraction processor 211 may extract the at least one keyword within a predetermined range of errors. More specifically, keyword extraction processor 211 may extract at least one meaningful word (e.g., jammed) associated with an M2M service, from SN traffic information (i.e., user input data) through a morpheme analysis, and then determine a keyword as a root (e.g., jam) of the meaningful word. In this case, word lists per function may be used to extract the key word(s). Furthermore, a root extraction may be performed using a Porter stemming algorithm. In other embodiments, a meaningful words (e.g., jammed) associated with an M2M service may be used as a keyword.

Location information obtaining processor 212 may obtain location information corresponding to the keyword(s) extracted by keyword extraction processor 211. Herein, the location information associated with the keyword(s) may be a location of user equipment 210 at the time when the SN traffic information (i.e., user input data) is input through user equipment 210. In order to obtain location information associated with an SNS user (or user equipment 210), SNS server 230 may be required to obtain a user's permission for use of the location information. When obtaining the user permission, location information obtaining processor 212 may obtain location information using a variety of typical schemes. For example, SNS users may directly input location information through user equipment 210. Alternatively, a location information module (e.g., GPS module) of user equipment 210 may obtain location information of user equipment 210. Accordingly, in those cases, location information obtaining processor 212 may receive corresponding location information (e.g., location information input by an SNS user, location information obtained by the location information module, etc.) from user equipment 210. In other embodiments, SNS server 230 may directly obtain location information of user equipment 210.

Device mapping processor 213 may determine at least one M2M device type (i.e., at least one mapping M2M device) corresponding to the extracted keyword(s). More specifically, device mapping processor 213 may determine at least one M2M device type associated with the extracted keyword(s), among a variety of M2M device types registered/managed in an M2M system (e.g., M2M service server 150). For example, in the case that subjective/qualitative keywords such as "cold," "hot," "earthquake" are extracted from SNS traffic information (i.e., user input data), corresponding M2M device types may be determined as (i) a weather sensor corresponding to the keywords "cold" and "hot" and/or (ii) an earthquake sensor corresponding to the keyword "earthquake." Furthermore, in the case that keywords are "accident," "road," and "jam," the M2M device type may be determined as a CCTV camera and/or a speed measurement device.

Message generating processor 214 may generate a request message including at least one of (i) the keyword(s) extracted by keyword extraction processor 211, (ii) the location information obtained by location information obtaining processor 212, and (iii) the M2M device type(s) determined by device mapping processor 213. For example, in at least one embodiment, message generating processor 214 may generate a request message including the keyword(s) and the location information. In other embodiments, message generating processor 214 may generate a request message including the M2M device type(s) and the location information. Herein, the request message may be generated according to an 'SNS M2M data exchange format' (SMDEF). The format of an SMDEF message will be described in more detail with reference to FIG. 3. When generating an SMDEF request message, message generating processor 214 may transmit the SMDEF request message to M2M service server 150.

Meanwhile, message reception processor 215 may (i) receive an SMDEF response message from M2M service server 150, and (ii) obtain corresponding M2M data (e.g., a content value) by analyzing (e.g., parsing) the received SMDEF response message, (iii) create content information (e.g., weather information) for providing a variety of additional services (e.g., a service providing accurate information or real time information), based on the M2M data, and (iv) transmit the content information to user equipment 630. Herein, message reception processor 215 may obtain the corresponding M2M data in "content" field 305 of the SMDEF response message.

FIG. 3 illustrates a structure of an SMDEF message in accordance with at least one embodiment.

As shown in FIG. 3, an SMDEF message (e.g., 300) according to the present embodiment may include a plurality of fields such as header 301, cmdObjType 302, locationInfo 303, keyword/deviceType 304, and content 305. Hereinafter, an SMDEF message which SNS server 230 transmits to M2M service server 150 may be referred to as "an SMDEF request message," or "a request message." An SMDEF message which M2M service server 150 transmits to SNS server 230 may be referred to as "an SMDEF response message," or "a response message."

"Header" field 301 may represent a header region. "cmdObjType" field 302 may include sender information (i.e., information on a sender transmitting a corresponding message). Herein, the sender information may represent whether the sender is SNS server 230 or M2M service server 150.

"LocationInfo" field 303 may include location information of user equipment (e.g., 210) supporting an SNS. "Keyword/deviceType" field 304 may include at least one of (i) at least one keyword and (ii) information on at least one M2M device type corresponding to the at least one keyword. For example, the M2M device type (or device class) may include a temperature sensor, a hygrometer, a CCTV camera, a speed measurement device, and so forth. More specifically, in the case that "keyword/deviceType" field 304 of the SMDEF request message includes at least one keyword, M2M service server 150 may obtain M2M device information (e.g., at least one M2M device type) corresponding to the at least one keyword.

"Content" field 304 may correspond to an additional field. In the case that the SMDEF message is an SMDEF request message, i.e., the sender is SNS server 230, "content" field 304 may be empty. However, in the case that the SMDEF message is an SMDEF response message, i.e., the sender is M2M service server 150, "content" field 304 may include M2M data (e.g., sensed data) obtained (collected) by a corresponding M2M device.

Figure 4:
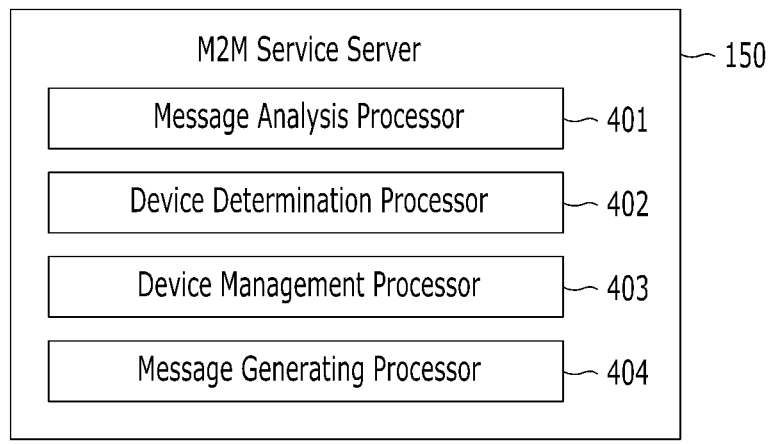
FIG. 4 illustrates an M2M service server in accordance with at least one embodiment.

FIG. 4 illustrates an M2M service server in accordance with at least one embodiment.

As shown in FIG. 4, the M2M service server (e.g., 150) may include message analysis processor 401, device determination processor 402, device management processor 403, and message generating processor 404.

Message analysis processor 401 may receive an SMDEF request message from SNS server 230, and obtain at least one of (i) at least one keyword, (ii) location information, and (iii) at least M2M device type, by analyzing the received SMDEF request message. For example, in the case that an SMDEF request message includes at least one keyword and location information, message analysis processor 401 may obtain the at least one keyword and the location information by analyzing the received SMDEF request message. In this case, message analysis processor 401 may obtain (or determine) M2M device information (e.g., at least one M2M device type) corresponding to the at least one keyword, from the device information storage unit. In other embodiments, in the case that an SMDEF request message includes location information and at least one M2M device type, message analysis processor 401 may obtain the location information and the at least one M2M device type by analyzing the received SMDEF request message. Message analysis processor 401 may be implemented in at least one of network applications (NA) 170 and network service capabilities layer (NSCL) 160.

Device determination processor 402 may perform a discovery procedure for determining at least one corresponding M2M device, based on analysis results (e.g., the M2M device type and the location information) of message analysis processor 401. In other words, device determination processor 402 may determine (or discover) the at least one corresponding M2M device, by performing the discovery procedure on a plurality of M2M devices registered in an M2M system (e.g., M2M service server 150). More specifically, in this case, device determination processor 402 may perform the discovery procedure on a containers resource in NSCL 160.

Device management processor 403 may (i) monitor periodically or in real time at least one corresponding M2M device (e.g., M2M sensors) determined through the discovery procedure, (ii) control operations or states of the corresponding M2M device(s), and (iii) obtain (or collect) M2M data (e.g., sensed data) from the corresponding M2M device(s). More specifically, in the case that the corresponding M2M device(s) is in a normal operation mode, device management processor 403 may obtain M2M data from the corresponding M2M device(s). In the case that the corresponding M2M device(s) is in a sleep mode (or waiting mode), M2M service server 150 may transmit a wake-up signal to the corresponding M2M device(s) such that the corresponding M2M device(s) performs a data collection operation (e.g., a sensing operation). In other embodiments, in order to collect much more M2M data, device management processor 403 may transmit a control signal for reducing a data collection period (e.g., a data sensing period) to the corresponding M2M device(s).

In other embodiments, in the case that an SN traffic amount associated with a specific keyword (or a specific device type) and a specific location is over a threshold value, device management processor 403 may transmit a data request to at least one neighboring M2M device (i.e., one or more M2M devices in a neighboring district of the specific location). M2M data obtained from the at least one neighboring M2M device may be referred to as "second M2M data," or "additional M2M data." Such procedure of obtaining the second M2M data from the neighboring M2M devices will be described in more detail with reference to FIG. 8 and FIG. 9.

Message generating processor 404 may generate an SMDEF response message including the collected M2M data (i.e., M2M data collected by device management processor 403), and transmit the SMDEF response message to SNS server 230. Herein, the collected M2M data may be included in "content" field 305 of the SMDEF response message. Furthermore, in the case that device management processor 403 obtains the second M2M data (i.e., the additional M2M data), message generating processor 404 may transmit the second M2M data (additional M2M data) to SNS server 230 such that additional services associated with a corresponding keyword can be provided to user equipment 210.

Figure 5:
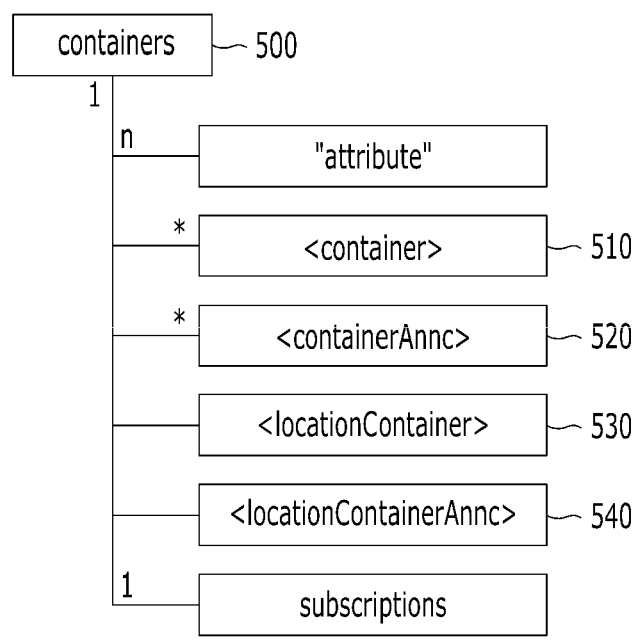
FIG. 5 illustrates a structure of a containers resource in accordance with at least one embodiment.

FIG. 5 illustrates a structure of a containers resource in accordance with at least one embodiment.

The containers resource 500 may represent a collection of container resources and containerAnnc resources. Particularly, as shown in FIG. 5, the containers resource 500 may include a plurality of resources such as <container> 510, <containerAnnc> 520, <locationContainer> 530, and <locationContainerAnnc> 540. Herein, the containers resource 500 may be in NSCL 160.

M2M service server 150 may obtain corresponding location information of a certain M2M device, through <locationContainer> resource 530. A content value corresponding to an M2M data may be obtained through <container> resource 510.

M2M service server 150 may determine at least one M2M device (at least one M2M device to be controlled) corresponding to an M2M device type and location information (e.g., location of user equipment), by analyzing a resource structure shown in FIG. 5.

Figure 6:
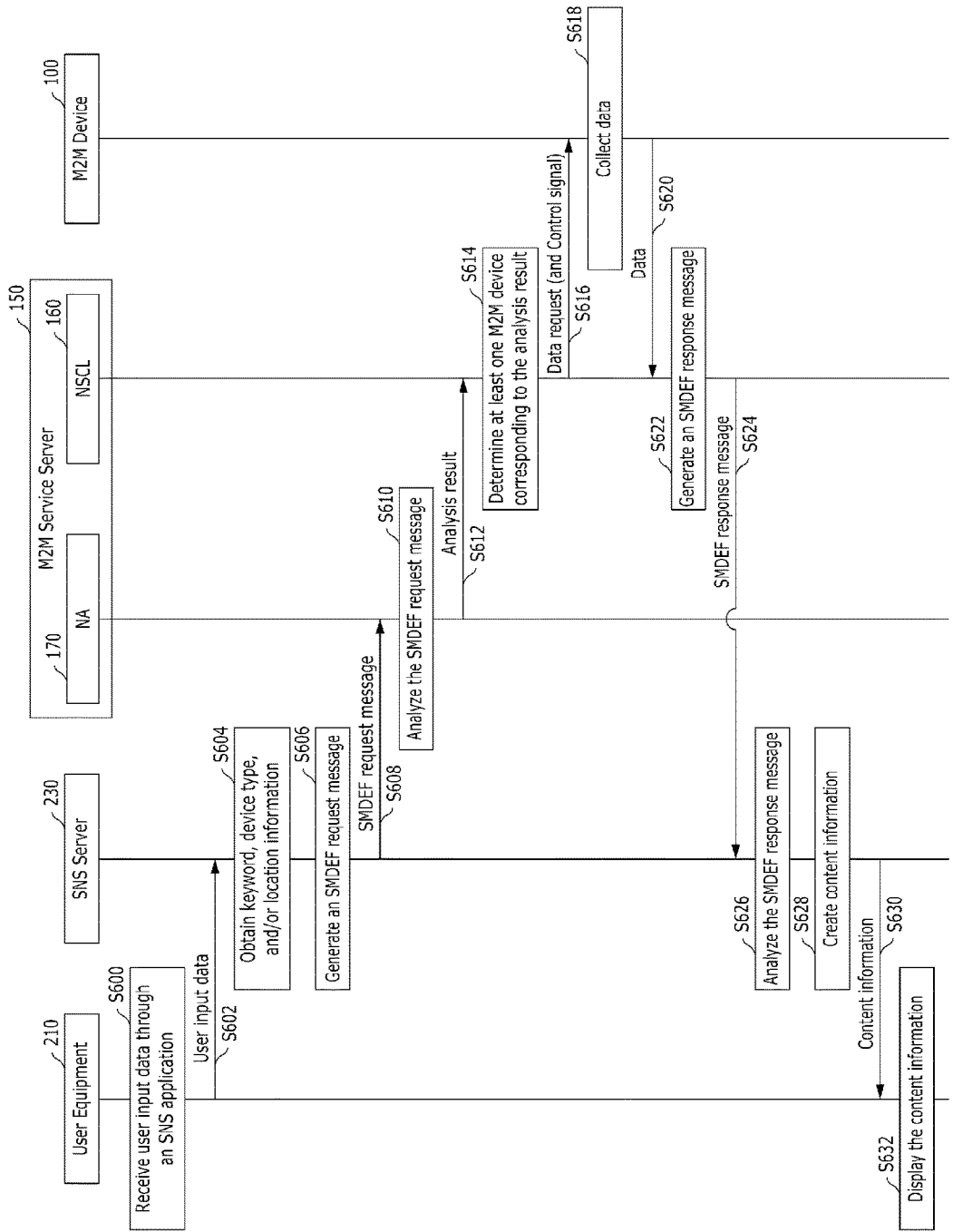
FIG. 6 illustrates a method of performing an interworking procedure between a social network service (SNS) and an M2M service in accordance with at least one embodiment.

FIG. 6 illustrates a method of performing an interworking procedure between a social network service and an M2M service in accordance with at least one embodiment.

Referring to FIG. 6, at step S600, user equipment 210 may receive user input data (e.g., SN traffic information such as text information and/or image information) through an SNS application from an SNS user. Herein, user equipment 210 may support an SNS. For example, the user input data may be an input message (e.g., "It is so hot today!").

At step S602, when receiving the user input data, user equipment 210 may transmit the received user input data to SNS server 230.

At step S604, when receiving the user input data from user equipment 210, SNS server 230 may obtain at least one of (i) at least one keyword, (ii) at least one device type, and (iii) location information. More specifically, SNS server 230 may extract the at least one keyword (e.g., hot) associated with an M2M service, from the received user input data (e.g., "It is so hot today!") according to a keyword extraction scheme. In this case, a keyword table may be used to extract at least one keyword from the user input data. Furthermore, SNS server 230 may obtain location information corresponding to the extracted keyword(s). In other embodiments, SNS server 230 may determine at least one M2M device type (e.g., a weather sensor such as a temperature sensor) corresponding to the extracted keyword(s) (e.g., "hot"). Since the keyword extraction procedure, the location information obtaining procedure, and the device type obtaining procedure were already described with reference to FIG. 2, the detailed descriptions thereof are omitted.

At step S606, SNS server 230 may generate a request message including at least one of (i) at least one keyword, (ii) at least one M2M device type, and (iii) location information obtained at step S604. For example, SNS server 230 may generate a request message including the keyword(s) and the location information. In other embodiments, SNS server 230 may generate a request message including the location information and the M2M device type(s). Herein, the request message may be generated according to an 'SNS M2M data exchange format' (SMDEF) as shown in FIG. 3. Herein, an SMDEF request message may include (i) header information, (ii) sender information, (iii) location information, and/or (iv) keywords or device types. Since the format of an SMDEF message was already described with reference to FIG. 3, the detailed description thereof is omitted.

At step S608, SNS server 230 may transmit the SMDEF request message to M2M service server 150.

At step S610, when receiving the SMDEF request message from SNS server 230, M2M service server 150 (more specifically, NA 170) may analyze (e.g., parse) the received SMDEF request message. More specifically, M2M service server 150 may obtain at least one of (i) at least one keyword, (ii) location information, and (iii) at least M2M device type, by analyzing the received SMDEF request message. For example, in the case that an SMDEF request message includes at least one keyword and location information, M2M service server 150 may obtain the at least one keyword and the location information by analyzing the received SMDEF request message. In this case, M2M service server 150 may further obtain (or determine) M2M device information (e.g., at least one M2M device type) corresponding to the at least one keyword, from device information storage unit. In other embodiments, in the case that an SMDEF request message includes location information and at least one M2M device type, M2M service server 150 may obtain the location information and the at least one M2M device type by analyzing the received SMDEF request message. Such message analysis procedure may be performed by NA 170 of M2M service server 150. In other embodiments, the message analysis procedure (S610) may be performed by NSCL 160 of M2M service server 150.

At step S612, when the message analysis procedure is complete, NA 170 of M2M service server 150 may transfer the analysis result to NSCL 160.

At step S614, NSCL 160 of M2M service server 150 may determine at least one M2M device corresponding to the message analysis result (e.g., location information, device type information). Herein, the corresponding M2M device(s) may be at least one M2M device which (i) corresponds to the device type information and (ii) is located in a specific district corresponding to the location information (e.g., location information of user equipment 210). For example, the specific district may be a specific location corresponding to the location information (e.g., location information of user equipment 210), or an area within a predetermined range from the specific location corresponding to the location information. More specifically, NSCL 160 may determine (or discover) at least one M2M device corresponding to the message analysis result (e.g., location information, device type information), by performing a discovery procedure on a plurality of M2M devices registered in an M2M system (e.g., M2M service server 150). Herein, the discovery procedure may be executed on a containers resource in NSCL 160.

At step S616, when at least one M2M device corresponding to the message analysis result (e.g., location information, device type information) is determined, NSCL 160 of M2M service server 150 may transmit a data request to the corresponding M2M device(s) (e.g., 100). More specifically, NSCL 160 of M2M service server 150 may monitor periodically or in real time at least one corresponding M2M device (e.g., M2M sensors) determined through the discovery procedure, and control operations or states of the corresponding M2M device(s). In the case that the corresponding M2M device(s) is in a sleep mode (or waiting mode), NSCL 160 may transmit a control signal (e.g., a wake-up signal) to the corresponding M2M device(s) such that the corresponding M2M device(s) performs a data collection operation (e.g., a sensing operation). In other embodiments, in order to collect much more M2M data, NSCL 160 may transmit a control signal for reducing a data collection period (e.g., a data sensing period) to the corresponding M2M device(s).

At step S618, when receiving the data request from NSCL 160 of M2M service server 150, the corresponding M2M device(s) (e.g., 100) may collect (or obtain) M2M data (e.g., sensed data) through a measurement process. Hereinafter, the M2M data may be referred to as "a content value."

At step S620, the corresponding M2M device(s) (e.g., 100) may transmit the collected M2M data in response to the data request, to NSCL 160 of M2M service server 150.

At step S622, when receiving the M2M data (i.e., content value) from the corresponding M2M device(s) (e.g., 100), NSCL 160 of M2M service server 150 may generate an SMDEF response message including the received M2M data. Herein, the received M2M data may be included in "content" field 305 of the SMDEF response message.

At step S624, NSCL 160 of M2M service server 150 may transmit the SMDEF response message to SNS server 230.

At steps S626, when receiving the SMDEF response message from NSCL 160 of M2M service server 150, SNS server 230 may obtain corresponding M2M data (e.g., 35° C.) by analyzing (e.g., parsing) the received SMDEF response message. More specifically, SNS server 230 may obtain the corresponding M2M data (e.g., 35° C.) in "content" field 305 of the SMDEF response message.

At steps S628, SNS server 230 may create content information (e.g., weather information) for providing a variety of additional services (e.g., a service providing accurate information or real time information), based on the M2M data (e.g., 35° C.). Herein, the additional services may be associated with the user input data received at step S602.

At step S630, SNS server 230 may transmit the content information to user equipment 630.

At step S632, when receiving the content information from SNS server 230, user equipment 210 may display the content information.

For example, in the case that an SNS user inputs the keyword "hot", SNS server 230 may transmit the keyword to M2M service server 150, and receive temperature data and humidity data (associated with a user location) in response, from the M2M service server 150. When receiving the temperature data and the humidity data, SNS server 230 may create weather information using the temperature data and the humidity data, and provide the weather information to user equipment 210. Furthermore, in the case that a temperature of a corresponding district is much higher than a normal temperature, SNS server 230 may provide additional information (e.g., damage examples, a preparation plan, etc.) associated with an intense heat.

Figure 7:
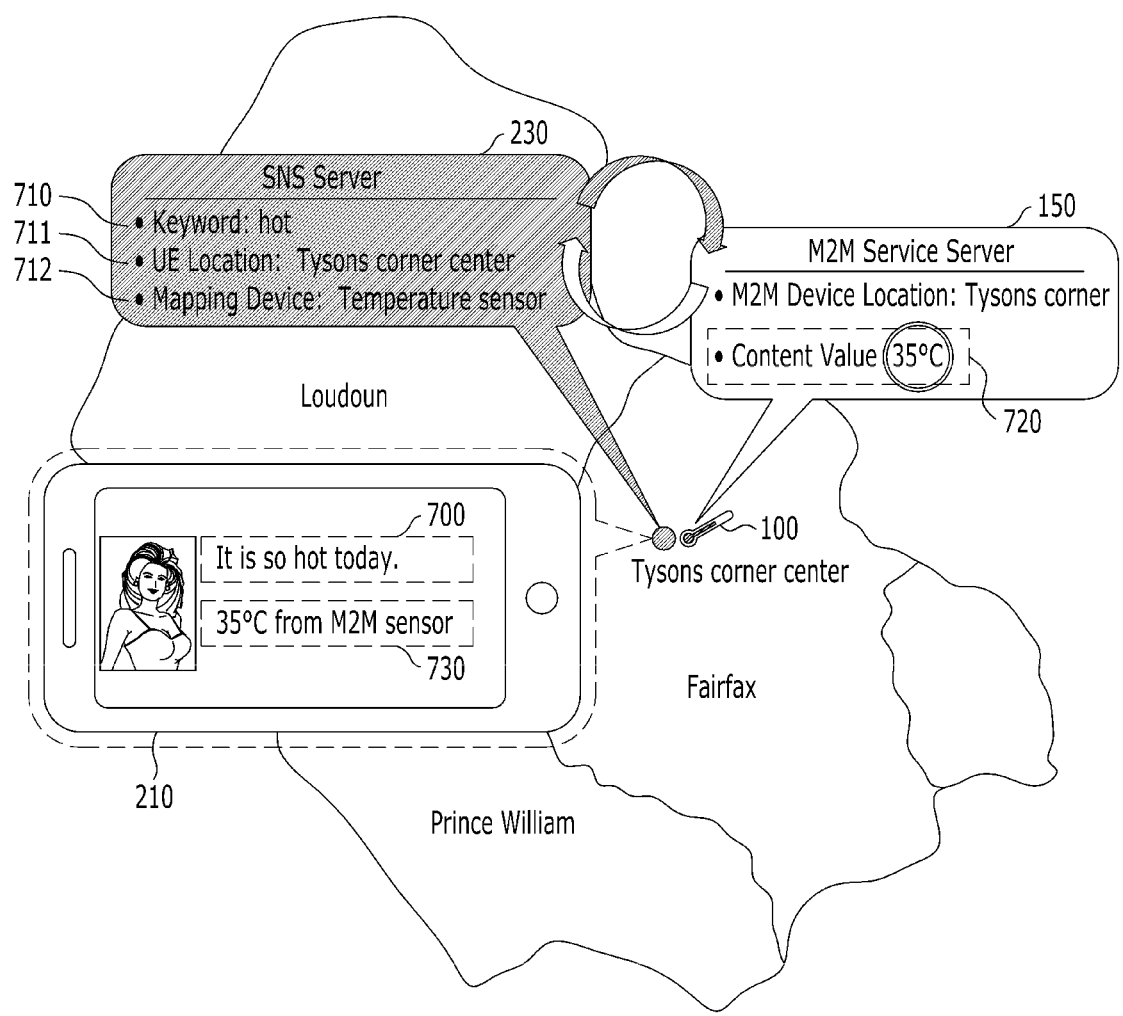
FIG. 7 illustrates an example of providing M2M data collected from at least one corresponding M2M device in a specific district according to an interworking method of FIG. 6 in accordance with at least one embodiment.

FIG. 7 illustrates an example of providing M2M data collected from at least one corresponding M2M device in a specific district according to an interworking method of FIG. 6 in accordance with at least one embodiment. In other words, FIG. 7 illustrates an example of collecting M2M data from at least one M2M device corresponding to analysis results (e.g., location information, device type information) of an SMDEF request message according to an interworking method shown in FIG. 6.

For example, in the case that an SNS user inputs an input message 700 such as "It is so hot today!" using an SNS application of user equipment 210, SNS sever 230 may extract at least one keyword 710 (e.g., hot) associated with an M2M service, from the user input data 700. Furthermore, SNS sever 230 may obtain location information 711 of the SNS user (e.g., user equipment 210). SNS sever 230 may determine at least one M2M device type (i.e., mapping M2M device) 712 corresponding to the extracted keyword 710 (e.g., hot). In this case, the M2M device type (i.e., mapping M2M device) 712 may be determined as a device type associated with a temperature measurement (e.g., a temperature sensor). SNS sever 230 may transmit the location information 711 and the device type information 712, through an SMDEF request message.

When receiving the location information 711 and the device type information 712 from SNS server 230, M2M service server 150 may determine at least one M2M device (i.e., at least one M2M device to be controlled) corresponding to the location information 711 and the device type information 712, among a plurality of M2M devices registered in an M2M system (more specifically, M2M service server 150). For example, M2M service server 150 may determine (or discover) a temperature sensor located in a specific district corresponding to the received location information 711. When obtaining M2M data (i.e., a content value) 720 from the determined temperature sensor, M2M service server 150 may transmit the M2M data 720 (e.g., 35° C.) to SNS server 230.

When receiving the M2M data (i.e., a content value) 720 from M2M service server 150, SNS server 230 may create content information using the M2M data (i.e., a content value) 720, and provide the content information to user equipment 210.

When receiving the content information from SNS server 230, user equipment 210 may display the received content information 730 on a certain region of a corresponding screen associated with an activated SNS application.

Figure 8:
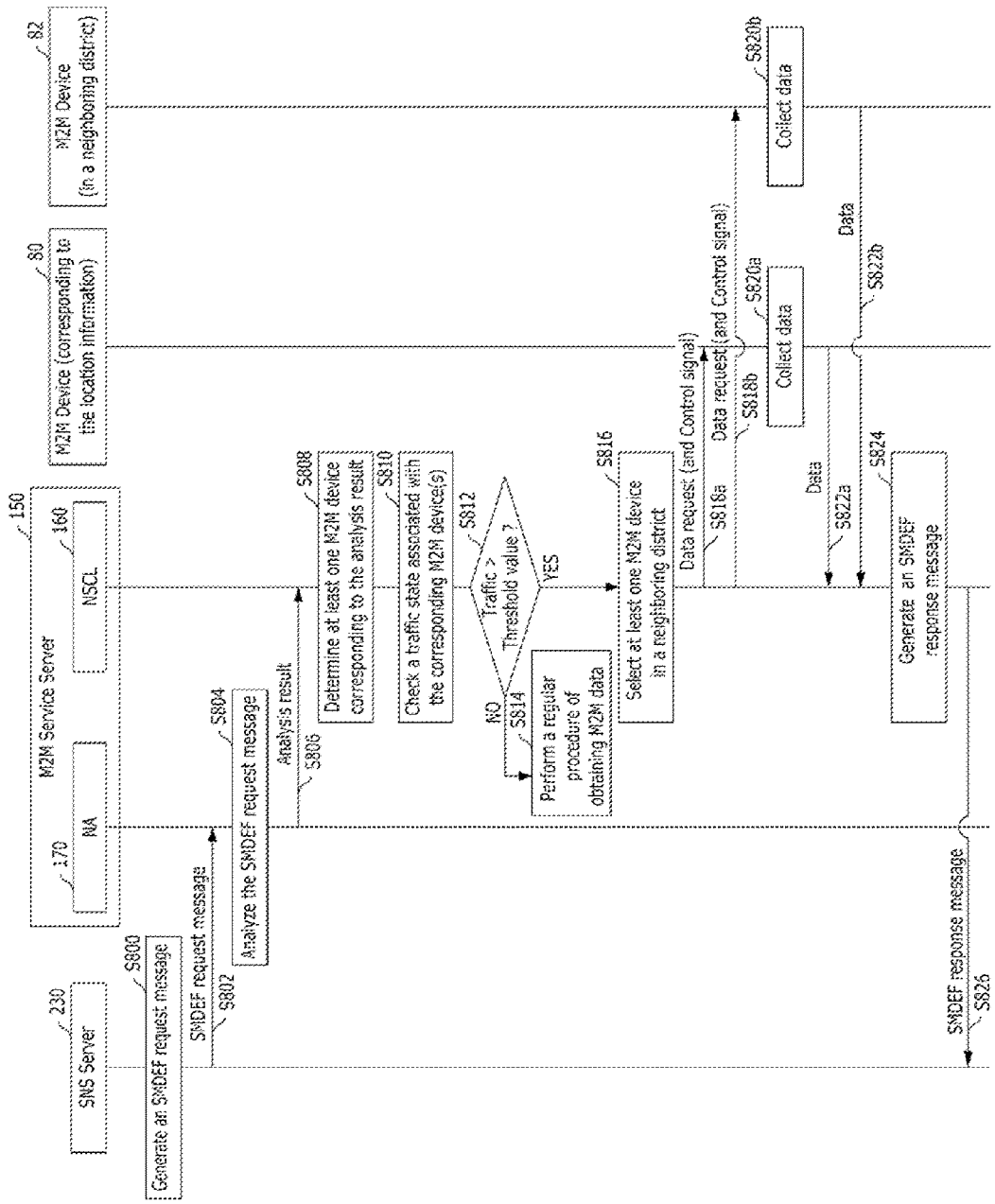
FIG. 8 illustrates a method of obtaining M2M data from M2M devices in a neighboring district according to a social network (SN) traffic state in accordance with at least one embodiment.

FIG. 8 illustrates a method of obtaining M2M data from M2M devices in a neighboring district according to a social network (SN) traffic state in accordance with at least one embodiment. In other words, FIG. 8 illustrates an example of extending a district range associated with an M2M data collection, according to an SN traffic state.

As described in FIG. 6, when receiving user input data through an SNS application from an SNS user, user equipment 210 may transmit the received user input data to SNS server 230. When receiving the user input data from user equipment 210, SNS server 230 may obtain at least one of (i) at least one keyword, (ii) at least one device type, and (iii) location information. Since the user input data transmission and the information obtaining procedure were already described with reference to operations S600 through S604 of FIG. 6, the detailed descriptions thereof are omitted.

At step S800, SNS server 230 may generate a request message including at least one of (i) at least one keyword, (ii) at least one M2M device type, and (iii) location information. For example, in at least one embodiment, SNS server 230 may generate a request message including the keyword(s) and the location information. In other embodiments, SNS server 230 may generate a request message including the location information and the M2M device type(s). Herein, the request message may be generated according to an 'SNS M2M data exchange format' (SMDEF) as shown in FIG. 3. Herein, an SMDEF request message may include (i) header information, (ii) sender information, (iii) location information, and/or (iv) keywords or device types. Since the format of an SMDEF message was already described with reference to FIG. 3, the detailed description thereof is omitted.

At step S802, SNS server 230 may transmit the SMDEF request message to M2M service server 150 (more specifically, network applications (NA) 170).

At step S804, when receiving the SMDEF request message from SNS server 230, M2M service server 150 (more specifically, NA 170) may analyze (e.g., parse) the received SMDEF request message. More specifically, M2M service server 150 may obtain at least one of (i) at least one keyword, (ii) location information, and (iii) at least one M2M device type, by analyzing the received SMDEF request message. For example, in the case that an SMDEF request message includes at least one keyword and location information, M2M service server 150 may obtain the at least one keyword and the location information by analyzing the received SMDEF request message. In this case, M2M service server 150 may further obtain (or determine) M2M device information (e.g., at least one M2M device type) corresponding to the at least one keyword. In other embodiments, in the case that an SMDEF request message includes location information and at least one M2M device type, M2M service server 150 may obtain the location information and the at least one M2M device type, by analyzing the received SMDEF request message. Such message analysis procedure may be performed by NA 170 of M2M service server 150. In other embodiments, the message analysis procedure (S804) may be performed in NSCL 160 of M2M service server 150.

At step S806, when the message analysis procedure is complete, NA 170 of M2M service server 150 may transfer the analysis result to NSCL 160.

At step S808, NSCL 160 of M2M service server 150 may determine at least one M2M device (hereinafter referred to as "corresponding M2M device") corresponding to the message analysis result (e.g., location information, device type information). More specifically, NSCL 160 may determine (or discover) at least one M2M device (e.g., M2M device 80) corresponding to the message analysis result (e.g., location information, device type information), by performing a discovery procedure on a plurality of M2M devices registered in an M2M system (e.g., M2M service server 150). Herein, the discovery procedure may be executed on a containers resource in NSCL 160.

At step S810, NSCL 160 of M2M service server 150 may check a traffic state (may be referred to as "SN traffic state" or "data traffic state") associated with the corresponding M2M device(s) determined at step S808, based on accumulated determination results of operation S808. Herein, the SN traffic state may represent the number of requests associated with the corresponding M2M device(s). In other words, the SN traffic state (or traffic amount) may represent the number of occurrences (e.g., input) of same/similar keywords associated with an M2M service of a specific location in a social network. For example, in the case that a plurality of SN users input same/similar keywords at a specific district (or a specific location), SNS server 230 transmit a plurality of request messages to M2M service server 150. When receiving the plurality of request messages from SNS server 230, M2M service server 150 may determine a corresponding M2M device for each request message. In this case, M2M service server 150 may recognize a plurality of requests associated with a specific M2M device of a specific location (or a specific district).

At step S812, NSCL 160 of M2M service server 150 may determine whether the SN traffic amount is over a predetermined threshold value.

At step S814, when the SN traffic amount is not over a predetermined threshold value (No—S812), a regular procedure of obtaining M2M data may be performed. More specifically, operations S616 through S620 may be performed. Since the operations S616 through S620 were already described in FIG. 6, the detailed descriptions thereof are omitted.

At step S816, when the SN traffic amount is over a predetermined threshold value (Yes—S812), NSCL 160 of M2M service server 150 may further select (or discover) at least one M2M device (hereinafter referred to as "neighboring M2M device," for example, M2M device 82) which is located in a neighboring district. Herein, a device type of the neighboring M2M device may be the same as or similar to a device type included in the analysis results (S806). In other embodiments, the neighboring M2M device may be an M2M device having a different type. Furthermore, when determining at least one neighboring M2M device, NSCL 160 of M2M service server 150 may further consider the SN traffic state (e.g., SN traffic amount). In this case, the number of neighboring M2M devices and/or a range of neighboring M2M devices may be determined based on the SN traffic state (e.g., SN traffic amount).

At steps S818a and S818b, NSCL 160 of M2M service server 150 may transmit a data request to each of the corresponding/neighboring M2M devices (e.g., 80, 82). More specifically, NSCL 160 of M2M service server 150 may monitor periodically or in real time the corresponding M2M device(s) (e.g., 80) and the neighboring M2M device(s) (e.g., 82), and may control operations or states of the corresponding/neighboring M2M device(s). In the case that the corresponding or neighboring M2M device is in a sleep mode, NSCL 160 may transmit a control signal (e.g., a wake-up signal) to the corresponding or neighboring M2M device such that the corresponding or neighboring M2M device performs a data collection operation (e.g., a sensing operation). In other embodiments, in order to collect much more M2M data, NSCL 160 may transmit a control signal for reducing a data collection period (e.g., a data sensing period) to the corresponding M2M device(s) and/or the neighboring M2M device(s). More specifically, in the case that a traffic amount of keywords associated with a specific district and/or a specific device increases in a social network service (SNS), M2M service server 150 may (i) control a data collection period of corresponding M2M devices, and/or (ii) obtain M2M data from at least one neighboring M2M devices. For example, in the case that the traffic amount temporally increases, M2M service server 150 may temporally wake up neighboring M2M devices in a sleep mode, and/or may shorten a data collection period in order to collect much more M2M data. For other examples, in the case that the traffic amount gradually increases, M2M service server 150 may continuously wake up neighboring M2M devices in a sleep mode, and/or may gradually shorten a data collection period according to a traffic state change.

At step S820a, when receiving the data request from NSCL 160 of M2M service server 150, the corresponding M2M device(s) (e.g., 80) may collect (or obtain) M2M data (e.g., sensed data) through a measurement process. Meanwhile, at step S820b, when receiving the data request from NSCL 160 of M2M service server 150, the neighboring M2M device(s) (e.g., 82) may collect (or obtain) M2M data (e.g., sensed data) through a measurement process. Hereinafter, the M2M data may be referred to as "a content value."

At step S822a, the corresponding M2M device(s) (e.g., 80) may transmit the collected M2M data in response to the data request (S818a), to NSCL 160 of M2M service server 150. Meanwhile, at step S822b, the neighboring M2M device(s) (e.g., 82) may transmit the collected M2M data in response to the data request (S818b), to NSCL 160 of M2M service server 150.

At step S824, when receiving the M2M data (i.e., content value) from the corresponding/neighboring M2M devices (e.g., 80, 82), NSCL 160 of M2M service server 150 may generate an SMDEF response message including the received M2M data. Herein, the received M2M data may be included in "content" field 305 of the SMDEF response message.

At step S826, NSCL 160 of M2M service server 150 may transmit the SMDEF response message to SNS server 230. The transmitted M2M data may be used to provide a variety of additional services to users. In other embodiments, M2M service server 150 may provide the collected M2M data to one or more different service providers such that an interworking between related services can be performed.

Figure 9:
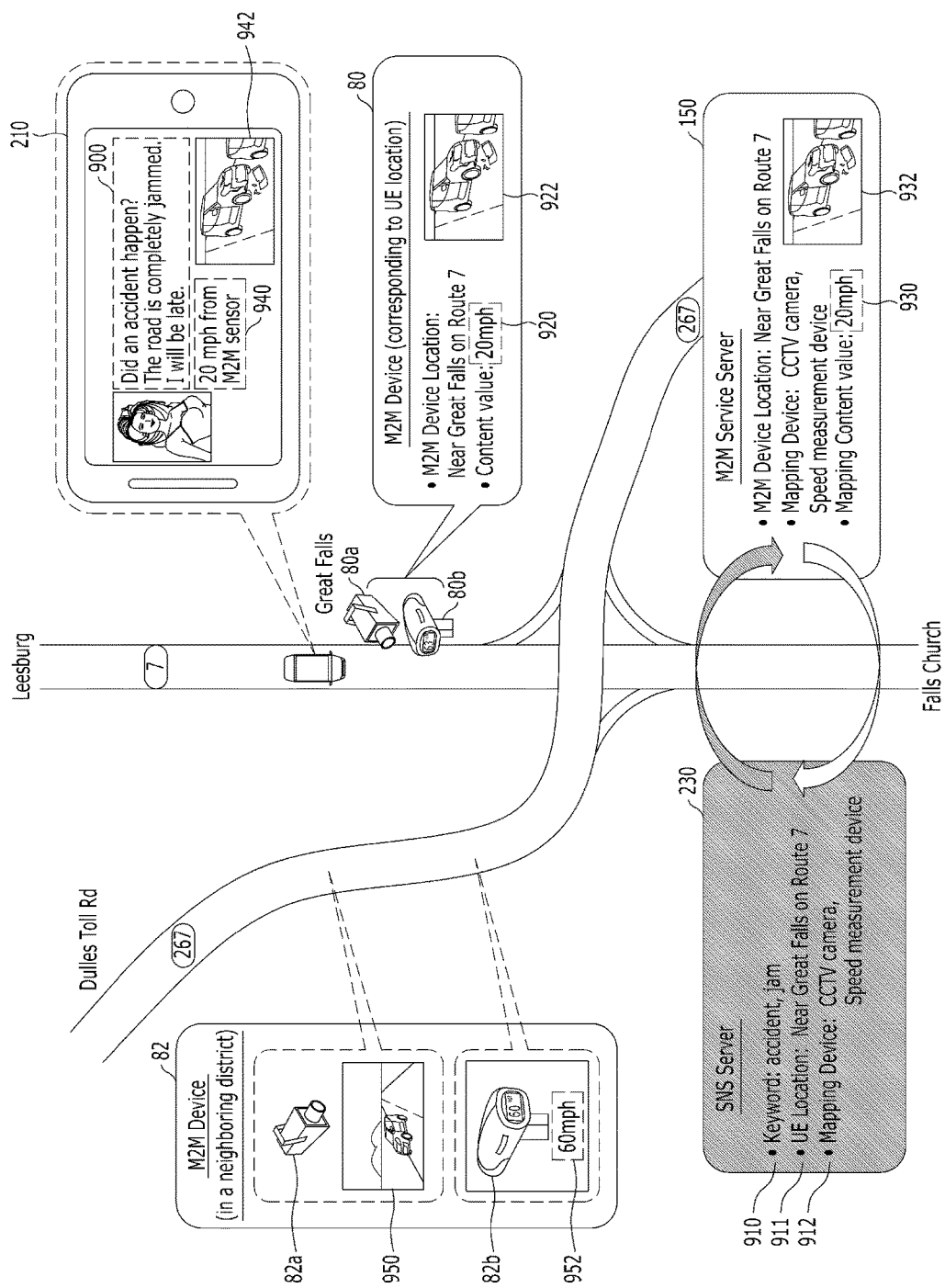
FIG. 9 illustrates an example of providing M2M data collected from at least one M2M device in a neighboring district according to an interworking method of FIG. 8 in accordance with at least one embodiment.

FIG. 9 illustrates an example of providing M2M data collected from at least one M2M device in a neighboring district according to an interworking method of FIG. 8 in accordance with at least one embodiment.

For example, in the case that an SNS user inputs an input message 900 (e.g., Did an accident happen? The road is completely jammed. I will be late) using an SNS application of user equipment 210, SNS sever 230 may extract at least one keyword 910 (e.g., accident, jam) associated with an M2M service, from the user input data 900. Furthermore, SNS sever 230 may obtain location information 911 of the SNS user (e.g., user equipment 210). SNS sever 230 may determine at least one M2M device type (i.e., mapping devices, for example, a CCTV camera, a speed measurement device) 912 corresponding to the extracted keyword 910 (e.g., accident, jam). SNS sever 230 may transmit the location information 911 and the device type information 912 to M2M service server 150, through an SMDEF request message.

When receiving the location information (i.e., the location information user equipment 210) 911 and the device type information 912 from SNS server 230, M2M service server 150 may determine at least one M2M device (i.e., at least one M2M device to be controlled) corresponding to the location information 911 and the device type information (i.e., mapping device information) 912, among a plurality of M2M devices registered in an M2M system (more specifically, M2M service server 150). For example, M2M service server 150 may determine (or discover) at least one traffic information collection devices (e.g., CCTV camera 80*a*, speed measurement device 80*b*) located in a specific district corresponding to the received location information 911. The traffic information collection devices 80 (e.g., CCTV camera 80*a*, speed measurement device 80*b*) may collect M2M data (e.g., traffic information) 920 and 922. When obtaining M2M data (i.e., content values) 920 and 922 from the determined traffic information collection devices 80 (e.g., CCTV camera 80*a*, speed measurement device 80*b*), M2M service server 150 may transmit the M2M data 930 and 932 to SNS server 230.

When receiving the M2M data (i.e., content values) 930 and 932 from M2M service server 150, SNS server 230 may create content information using the received M2M data (i.e., content value) 930 and 932, and provide the content information to user equipment 210.

When receiving the content information from SNS server 230, user equipment 210 may display the received content information 940 and 942 on a certain region of a corresponding screen displaying an SNS application.

Meanwhile, in the case that an SN traffic amount associated with a specific keyword and a specific location is over a threshold value, M2M service server 150 may transmit a data request to at least one neighboring M2M device 82 (i.e., one or more M2M devices in a neighboring district of the specific location). M2M data (e.g., 950, 952) obtained from the at least one neighboring M2M device 82 (more specifically, CCTV camera 82*a* and speed measure device 82*b*) may be referred to as "second M2M data," or "additional M2M data." M2M service sever 150 may transmit the received second M2M data (additional M2M data) 950 and 952 to SNS server 230 such that additional services (e.g., information on a detour, for example, a vehicle average speed such as 60 mph) associated with a corresponding keyword can be provided to user equipment 210. Since a procedure of obtaining the second M2M data from the neighboring M2M devices was already described with reference to FIG. 4 and FIG. 8, the detailed descriptions thereof are omitted.

When receiving the second M2M data (i.e., additional M2M data) (e.g., 950 and 952) from M2M service server 150, SNS server 230 may create content information using the received second M2M data 950 and 952, and provide the content information to user equipment 210. When receiving the content information from SNS server 230, user equipment 210 may further display the received second content information 950 and 952 on a corresponding screen displaying an SNS application.

As described above, the present embodiment may enhance a data reliability and a data accuracy through interworking of an M2M service and an SNS. Particularly, the present embodiment may enhance a reliability/accuracy of SNS data (i.e., data generated/shared through an SNS) by further providing corresponding M2M data. For example, in the case that an unexpected emergency situation (e.g., earthquake, flood, etc.) happens, the present embodiment may provide rapid/subjective/adaptive data through an SNS, and provide accurate/objective data through an M2M service.

Furthermore, an M2M service server according to the present embodiment may analyze an SN traffic state (e.g., the number of requests associated with a specific keyword) associated with a specific keyword and/or a specific location. For example, in the case that the number of occurrences of keywords belonging to an identical or similar category is over a threshold value, the present embodiment may wake up neighboring M2M devices in a sleep mode, and/or may shorten a data collection period in order to collect much more M2M data. In this case, such collected M2M data may be provided to users, through an additional service. Accordingly, the present embodiment may provide data which is generated adaptively and in real time according to an environment change.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing an interworking procedure between a social media service and a machine to machine (M2M) service in a social media server including at least one processor, the method comprising:
   receiving, by the social media server, user input data from user equipment;
   extracting, by the social media server, at least one keyword associated with the M2M service to interwork with the social media service from the received user input data, wherein a user activity is a user social media activity performed using a social media service application of the user equipment and does not include an M2M service subscription;
   obtaining, by the social media server, location information from the extracted user input data;
   generating, by the social media server, a request message for an associated M2M data, wherein the associated M2M data includes the at least one keyword and the location information from the extracted user input data;
   transmitting, by the social media server, the request message to an M2M service server, wherein the M2M service server is configured to obtain the associated M2M data from at least one M2M device type;
   receiving, by the social media server, the associated M2M data in response to the request message directly from the M2M service server; and
   providing, by the social media server, additional information formed based on the associated M2M data, to corresponding user equipment.

2. The method of claim 1, wherein the location information is a location of the corresponding user equipment at a time when the user input data is input.

3. The method of claim 2, wherein the location information includes at least one of (i) location information obtained through a location information obtaining system of the corresponding user equipment, and (ii) location information input by a user.

4. The method of claim 1, wherein the at least one keyword is extracted using a keyword table.

5. The method of claim 1, wherein the request message includes at least one of a header, sender information, the location information, the at least one keyword, and an additional field for an M2M content value.

6. A method of performing an interworking procedure between a social media service and a machine to machine (M2M) service in a social media server including at least one processor, the method comprising:
   receiving, by the social media sever, user input data from user equipment;
   extracting, by the social media server, at least one keyword associated with the M2M service to interwork with the social media service from the received user input data, wherein a user activity is a user social media activity performed using a social media service application of the user equipment and does not include an M2M service subscription;
   obtaining, by the social media server, location information from the extracted user input data;
   determining, by the social media server, at least one M2M device type corresponding to the at least one keyword;

generating, by the social media server, a request message for an associated M2M data, wherein the associated M2M data includes the location information and the at least one M2M device type;

transmitting, by the social media server, the request message to an M2M service server, wherein the M2M service server is configured to obtain the associated M2M data from at least one M2M device type;

receiving, by the social media server, the associated M2M data in response to the request message from the M2M service server; and providing, by the social media server, additional information formed based on the associated M2M data, to corresponding user equipment.

7. The method of claim 6, wherein the location information includes at least one of (i) location information obtained through a location information obtaining system of the corresponding user equipment, and (ii) location information input by a user.

8. The method of claim 6, wherein the at least one keyword is extracted using a keyword table.

9. The method of claim 6, wherein the request message includes at least one of a header, sender information, the location information, the at least one M2M device type, and an additional field for an M2M content value.

10. A method of performing an interworking procedure between a social media service and a machine to machine (M2M) service in an M2M service server including at least one processor, the method comprising:

receiving, by the M2M service server, a request message for associated M2M data from a social media server, wherein the social media server is configured (i) to extract at least one keyword associated with the M2M service to interwork with the social media service, from user input data created through a user activity associated with the social media service, (ii) to generate the request message for the associated M2M data, based on the at least one keyword, (iii) to transmit the request message to the M2M service server, and (iv) to receive the associated M2M data in response to the request message from the M2M service server, and wherein the user activity is a user social media activity performed using a social media service application of the user equipment and does not include an M2M service subscription;

obtaining, by the M2M service server, (i) at least one of one or more keywords associated with the M2M service and one or more M2M device types, and (ii) location information, by analyzing the request message received from the social media server;

determining, by the M2M service server, at least one M2M device corresponding to an analysis result of the received request message;

obtaining, by the M2M service server, the associated M2M data from the at least one M2M device; and transmitting, by the M2M service server, the obtained associated M2M data directly to the social media server in response to the received request message such that additional information formed based on the transmitted associated M2M data is provided by the social media server to corresponding user equipment.

11. The method of claim 10, wherein the obtaining (i) at least one of one or more keywords and one or more M2M device types, and (ii) location information includes:

determining one or more M2M device types corresponding to the one or more keywords, in a case that the request message includes the one or more keywords and the location information.

12. The method of claim 11, wherein the determining includes:

determining the at least one M2M device corresponding to the one or more device types and the location information.

13. The method of claim 12, wherein the determining includes:

determining the at least one M2M device by performing a resource discovery.

14. The method of claim 10, wherein the obtaining of the associated M2M data further includes:

controlling a data collection period if the at least one M2M device is in a normal operation mode.

15. The method of claim 10, wherein the obtaining of the associated M2M data further includes:

performing a wake-up procedure if the at least one M2M device is in a sleep mode.

16. The method of claim 10, further comprising:

determining a social media traffic state associated with the at least one M2M device;

determining at least one neighboring M2M device based on the location information when a social media traffic amount is over a threshold value; and transmitting a data request to the at least one neighboring M2M device.

17. The method of claim 16, further comprising:

receiving additional M2M data from the at least one neighboring M2M device; and providing the additional M2M data to at least one of the social media server and a different service provider.

18. The method of claim 1, wherein the M2M service includes a remote metering, a building management, a facility management, a vending machine management, an indoor lighting adjustment, traffic information, a vehicle control, an emergency rescue, a fire alarm, a security alarm, and telemetry.

19. The method of claim 6, wherein the M2M service includes a remote metering, a building management, a facility management, a vending machine management, an indoor lighting adjustment, traffic information, a vehicle control, an emergency rescue, a fire alarm, a security alarm, and telemetry.

20. The method of claim 10, wherein the M2M service includes a remote metering, a building management, a facility management, a vending machine management, an indoor lighting adjustment, traffic information, a vehicle control, an emergency rescue, a fire alarm, a security alarm, and telemetry.

* * * * *